Patented Apr. 6, 1954

2,674,567

UNITED STATES PATENT OFFICE 2,674,567

DETHIOLIZING HYDROCARBONS

James L. Meadows, Port Arthur, Tex., assignor to The Texas Company, New York, N. Y., a corporation of Delaware No Drawing. Application June 7, 1951, Serial No. 230,417

5 Claims. (Cl. 196—32)

This invention relates to the treatment of hydrocarbons for the removal of sulfur compounds, particularly mercaptans. The invention is directed especially to certain improvements in the treating of hydrocarbons with alkali metal hydroxides in solution with glycol ethers.

In the treatment of light distillates such as gasoline with aqueous alkali metal hydroxides it is possible to effect a removal of the lower molecular weight mercaptans, but the higher molecular weight mercaptans cannot be satisfactorily removed in this manner. A substantially complete removal of the mercaptans can be obtained by treating the hydrocarbon with solutions of alkali metal hydroxides in glycol ethers; but this process has the disadvantage that an impairment of color accompanies the operation. The solution of hydroxide and glycol ether becomes discolored and functions to impart a yellow or brownish color to the distillate treated. The discovery has now been made that by including a nitrogenous phenolic or nitrogenous hydroxy aromatic compound in the glycol ether solution of alkali metal hydroxide, this impairment in color may be inhibited while a substantially complete removal of mercaptans may be effected.

The invention contemplates the treatment of light hydrocarbon distillates such as kerosene and gasoline with an alkali metal hydroxide in an ether of a polyhydric alcohol, and in the presence of a nitrogenous phenolic compound. In practicing the invention the major portion of the solvent in which the alkali metal hydroxide is contained consists of the glycol ether. Preferred glycol ethers are diethylene glycol monomethyl ether, commonly known as methyl Carbitol, and ethylene glycol monomethyl ether, commonly known as methyl Cellosolve.

The color inhibiting material, which, in accordance with invention, is used in the glycol ether solution of alkali metal hydroxide, is a nitrogenous phenolic compound which forms a salt with the hydroxide and includes aminophenols or aminophenolic compounds, particularly amino hydroxy aromatic compounds. The color inhibiting nitrogenous phenolic compound is effective in a relatively small proportion. While the color inhibiting function is somewhat in proportion to the amount of inhibitor used, it is found that relatively small proportions such as some two to ten per cent by volume of the treating solution are adequate to prevent any serious impairment of color.

In order to obtain a complete removal of the mercaptans the alkali metal hydroxide, such as sodium or potassium hydroxide, should be used in strong solution in the glycol ether, such as normalities of about two to three and higher. The dethiolizer solution is used in amounts of some five to ten per cent by volume of the hydrocarbon treated.

The dethiolizer solution may be used in anhydrous or aqueous solution. It is preferred, however, to use an aqueous solution when regenerating and recycling, since it is found that the presence of water has a beneficial effect in the glycol ether dethiolizer solution in maintaining extraction efficiently for increased periods of time. The solution can tolerate about 15% by volume of water without appreciable reduction in extraction efficiency.

The salts formed from the nitrogenous phenolic compounds are relatively non-volatile, which afford an advantage in regenerating the treating solution. Thus, in air blowing for reactivating the solution, any loss of the inhibitor is reduced to a minimum.

As typical of the invention a sour gasoline was treated in a solution of caustic potash and methyl Carbitol containing 5% by volume of para-aminophenol to produce a doctor sweet product.

In a second example the sour gasoline was treated with a solution of caustic potash and methyl Carbitol containing 5% by volume of picric acid to produce a doctor sweet gasoline. In this treatment it is considered possible that the picric acid may have been converted in the presence of the mercaptans to the picramic acid, and that the latter acid also functioned as a color inhibiting material.

In another treat the sour gasoline was treated with a solution of caustic potash and methyl Carbitol containing 5% by volume of tetraethylene pentamine to produce a doctor sweet gasoline.

In each instance the color of the threated gasoline product was greatly superior to the color of the product obtained when treating without the presence of the color inhibiting material. The treat in the presence of the para-aminophenol gave the best colored product.

Although a preferred embodiment of the invention has been described herein, it will be understood that various changes and modifications may be made therein, while securing to a greater or less extent some or all of the benefits of the invention, without departing from the spirit and scope thereof.

I claim:

1. The process of dethiolizing hydrocarbons that comprises contacting the hydrocarbons with a solution of alkali metal hydroxide in diethylene glycol monomethyl ether containing a relatively small proportion of a phenolic compound selected from the group consisting of aminophenols and nitrophenols effective to inhibit impairment in color of the hydrocarbon.

2. The process of dethiolizing hydrocarbons that comprises contacting the hydrocarbons with a solution of alkali metal hydroxide in a glycol ether, selected from the group consisting of ethylene and diethylene glycol monomethyl ethers, containing a relatively small proportion of a para-aminophenol effective to inhibit impairment in color of the hydrocarbon.

3. The process of dethiolizing hydrocarbons that comprises contacting the hydrocarbons with a solution of alkali metal hydroxide in a glycol ether, selected from the group consisting of ethylene and diethylene glycol monomethyl ethers, containing a relatively small proportion of a phenolic compound selected from the group consisting of aminophenols and nitrophenols effective to inhibit impairment in color of the hydrocarbons.

4. The process of dethiolizing hydrocarbons that comprises contacting the hydrocarbons with a solution of alkali metal hydroxide in a glycol ether, selected from the group consisting of ethylene and diethylene glycol monomethyl ethers, containing a relatively small proportion of an aminophenol effective to inhibit impairment in color of the hydrocarbons.

5. The process of dethiolizing hydrocarbons that comprises contacting the hydrocarbons with a solution of alkali metal hydroxide in diethylene glycol monomethyl ether containing a relatively small proportion of para-aminophenol effective to inhibit impairment in color of the hydrocarbons.

References Cited in the file of this patent

UNITED STATES PATENTS

| Number | Name | Date |
| --- | --- | --- |
| 2,472,473 | Fetterly | June 7, 1949 |
| 2,546,345 | Meadows et al. | Mar. 27, 1951 |
| 2,552,399 | Browder | May 8, 1951 |